Dec. 12, 1944.  W. H. REINHOLZ  2,365,003
COLLAPSIBLE SEAT
Filed July 1, 1940
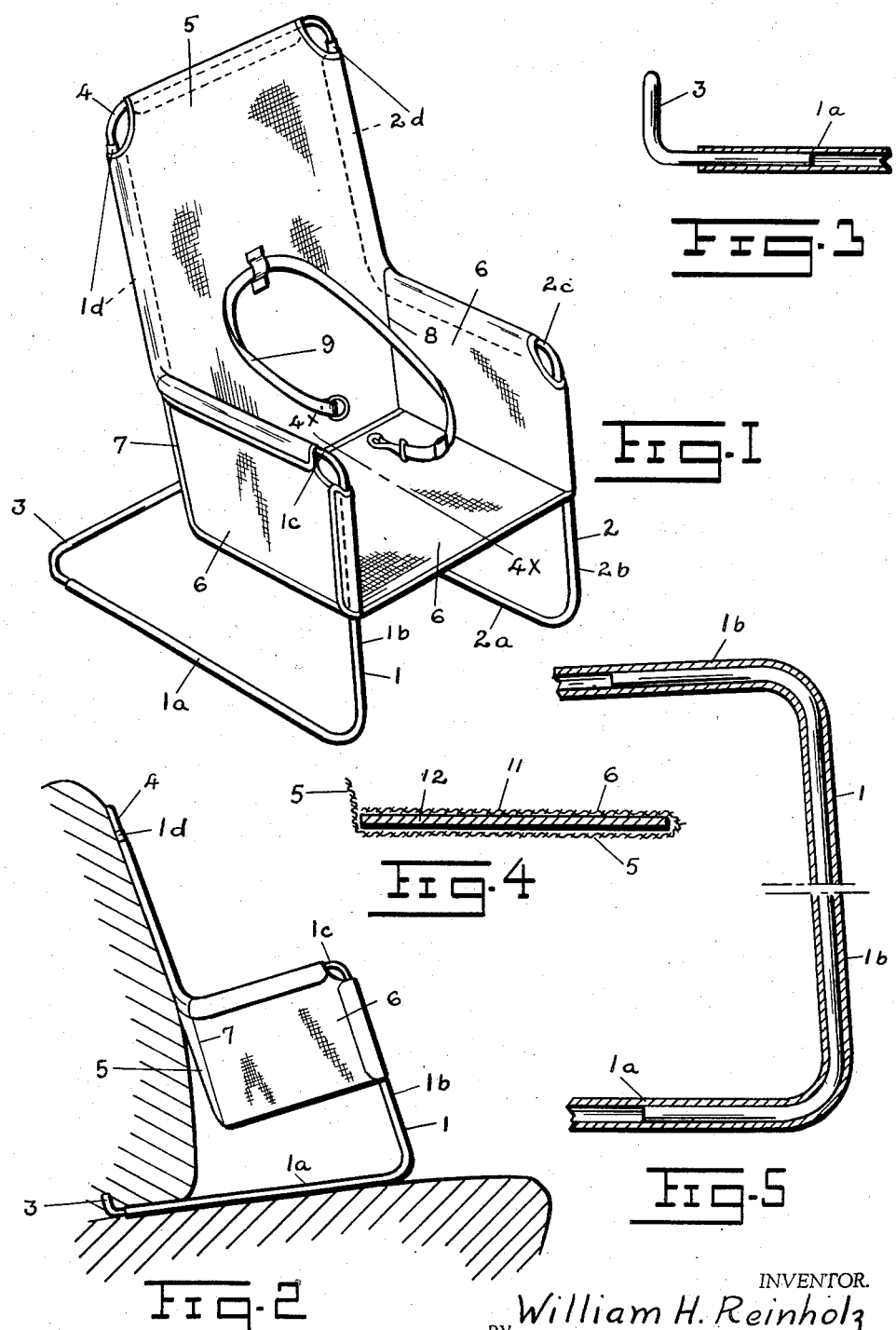
INVENTOR.
William H. Reinholz
BY
Frank Keifer
ATTORNEY.

Patented Dec. 12, 1944

2,365,003

UNITED STATES PATENT OFFICE 2,365,003

COLLAPSIBLE SEAT

William H. Reinholz, Irondequoit, N. Y.

Application July 1, 1940, Serial No. 343,345

7 Claims. (Cl. 155—11)

The object of this invention is to provide a collapsible baby seat for use on the seat of an automobile, although it will be understood that the seat can be used for other purposes, such as a seat at a picnic, or in the yard, etc.

Another object of the invention is to make the frame of the seat in four sections, two of which are made of tubes bent to the desired shape and the other two are made of rods bent to the desired shape.

Another object of the invention is to make two of the sections so that they will telescope into the ends of the other two sections in planes at right angles to each other, by which all of the four sections are firmly held together.

Another object of the invention is to provide a metal framework with a fabric seat and back therefor that can be easily placed on the frame work and removed therefrom.

Another object of the invention is to provide a seat with a pocket with a board reinforce in the pocket to reinforce the bottom of the seat and hold it in shape.

These and other objects of the invention will be illustrated in the drawing, described in the specification, and pointed out in the claims at the end thereof.

In the drawing:

Figure 1 is a perspective view of the chair, showing the chair assembled.

Figure 2 is a side elevation of the chair placed on an automobile seat.

Figure 3 is a detail view of the joint between one of the rod members and one of the tubular members.

Figure 4 is a section on the line 4x—4x of Figure 1.

Figure 5 is a sectional view of the upright member 1b with the reinforcing rod inside of it.

In the drawing like reference numerals indicate like parts.

In the drawing reference numerals 1 and 2 indicate the upright members of the chair, each of which is preferably made of a single tube bent to the form illustrated, in which 1a indicates the base or floor member, 1b indicates the upright leg member, 1c indicates the arm member, and 1d indicates the upright back member of the chair. All of these four members are formed by bending one single piece of tube of the requisite length. The member 2 in all these respects is like the member 1. The two floor members 1a and 2a are joined together by a rod 3 bent to U shape, the yoke and part of the side members of which are bent upright or at right angles to the forwardly extending members which engage the tubular sections. This member 3 is illustrated in Figures 1, 2 and 3, and in Figure 2 the member 3 is shown engaged between the seat cushion and back cushion forming the seat of an automobile, with the upright portion of the U-shaped member engaged back of the back cushion of the seat, or engaged into the back cushion of the seat.

The upright members 1 and 2 are joined together by the U-shaped member 4, which is a rod bent to the desired shape, the parallel sides of which engage in the tubes 1d and 2d. The U-shaped members join the side members together and hold them in a parallel relation in a frame that is substantially rigid.

It will also be understood that the parallel sides of the U-shaped member 4 engage the members 1 and 2 at the top in a plane practically at right angles to the plane in which the parallel sides of the U-shaped member 3 engage these same members at the bottom, and this engagement of the U-shaped members in planes at right angles to each other holds the members 1 and 2 in rigid relation with each other and with the U-shaped members 3 and 4.

As shown in Figures 1 and 2, a fabric seat is supported from this framework. This fabric seat is made of two pieces of cloth. The piece 5 forms the back and the seat, and the piece 6 forms the sides and the seat. These two pieces of cloth cross each other in the seat, so that the seat is formed of two layers of cloth which enclose a pocket 11 between them, and in this pocket is held a rectangular board 12 which spans the width of the chair and fills the pocket from front to back.

The edges of the cloth are turned over and sewed with a seam to form sleeves therein, which engage with the metal members of the chair. The cloth material 5 and 6 will be sewed together along the corners 7 and 8, and the sleeves that engage the members 1c and 1d can run continuously instead of leaving a portion of the metal bare.

The pocket that holds the board 12 in the seat is open at the back of the seat, so that the board can be removed from the seat and the fabric member can be slipped up to the top of the chair. The U-shaped member can then be disengaged on one side. This permits the fabric seat member to be removed bodily from the chair for the purpose of washing it or replacing it with another fabric member, or for the purpose of collapsing the chair in shipping it.

It will also be understood that by the removal of the U-shaped members 3 and 4, the side members can be brought together for the purpose of making a small package for shipment. In this way the combination is knocked down.

It will also be understood that the U-shaped members 3 and 4 can be tubes and the members 1 and 2 can be rods, or all of the members can be made of tubes so long as they telescope together.

It will also be understood that the upright member 1b can be reinforced by a rod enclosed inside of the tube, which rod will extend around the corners of the bottom and top of the member 1b. This is shown in Figure 5.

A safety belt 9 is attached to the back of the fabric seat, which belt can be fastened around the child to securely hold the child in place.

It will also be understood that this seat can be built in large sizes as well as small sizes, so that it can be used for adults as well as for children.

It will also be understood that the members 1 and 2 can be made of flat stock, and they can be joined together by the U-shaped members 3 and 4, which can be channel-shaped in cross section, but in all cases the one pair of members will be male and the other pair of members will be female at the places where they join together.

I claim:

1. A seat having a frame comprising two side members each bent to form a base and two uprights with a horizontal member between the uprights, U-shaped means at each end of the side members making telescoping engagement with the ends of the side members and holding them in fixed relation to each other.

2. A seat having a frame comprising two side members each bent to form a base and two uprights with a horizontal member between the uprights, U-shaped members making telescoping engagement at both ends with the upper and lower ends of the side members and holding them in fixed relation to each other, a fabric seat and back member having sleeves formed on the sides and top of the back portion thereof engaging the upper U-shaped member of the frame and the two upright members connected thereto, and a fabric seat member having sleeves formed on the ends thereof engaging the horizontal members of the frame, said seat member having an intermediate portion thereof overlapping the seat portion of the seat and back member.

3. A seat having a frame comprising two side members each bent to form a base and two uprights with a horizontal member between the uprights, U-shaped members making telescoping engagement at both ends with the upper and lower ends of the side members and holding them in fixed relation to each other, a fabric seat and back member having sleeves formed on the sides and top of the back portion thereof engaging the upper U-shaped member of the frame and the two upright members connected thereto, and a fabric seat member having sleeves formed on the ends thereof engaging the horizontal members of the frame, said seat member having an intermediate portion thereof overlapping the seat portion of the seat and back member, said overlapping portions being connected together on three sides to form a pocket, a board reinforce held in said pocket.

4. A seat having a frame comprising as elements, two side members, each bent to form a horizontal base, a forward upright on the base, a horizontal member extending rearwardly from the upper end of said upright, a second upright extending upwardly and at a small rearward inclination from the rear end of said horizontal member, the bases and second uprights being formed to lie parallel with and contactual of the upper face of an auto-seat cushion and the front face of an auto-seat back cushion respectively, and further comprising as elements a cross member at the rear ends of the bases and a cross-member at the upper ends of the second uprights, said cross members making telescopic engagement with said ends of said bases and uprights respectively and holding the side members in fixed relation to each other, the frame elements at the rear end of the bases being offset out of the plane of the bases a relatively small distance for indentingly engaging the upholstery of one of the cushions of the automobile seat to prevent forward movement of the seat.

5. A seat having a frame comprising as elements, two side members, each bent to provide a base, a forward upright, a seat arm and a back upright, and transverse members, connecting the upper and lower portions of said side members to form a rigid frame structure, the frame elements at the rear end of the bases being formed to provide an anchoring structure well to the rear of the plane of said back uprights said anchoring structure being offset vertically from the plane of said bases for indentingly engaging the upholstery of an automobile seat to prevent forward movement of the seat.

6. In a child's seat for disposition on an automobile seat, the combination of: a back frame for lying flat against the rearwardly inclined back section of the automobile seat; arms projecting from the lower end of said back frame; front upright legs extending downward from the front ends of said arms; and a base frame extending rearwardly from the lower ends of said legs substantially to the rear of the plane of said back, said child's seat being formed for insertion of said base frame between the back and seat sections of the automobile seat, said back frame and base frame including side members and transverse tie members, and said base frame including an anchoring structure at its rear end and well to the rear of the plane of said back frame, said anchoring structure being offset vertically from the general plane of said base frame for indentingly pressing against the upholstery of one of said automobile seat sections for preventing forward displacement of the seat frame base relative to said automobile seat.

7. In a child's seat for disposition on an automobile seat, the combination of: a flat back frame; a seat; legs; and a base projecting substantially to the rear of the plane of said back, said child's seat being formed for insertion of said base between the back and seat sections of said automobile seat, and said base including a cross tie bar at its rear end offset vertically from the general plane of said base for indentingly engaging the upholstery of one of said back and seat sections for preventing forward displacement of the child's chair relative to the automobile seat.

WILLIAM H. REINHOLZ.